Oct. 21, 1930.   W. H. LANE   1,779,069
PICTURE FRAME
Filed March 28, 1930
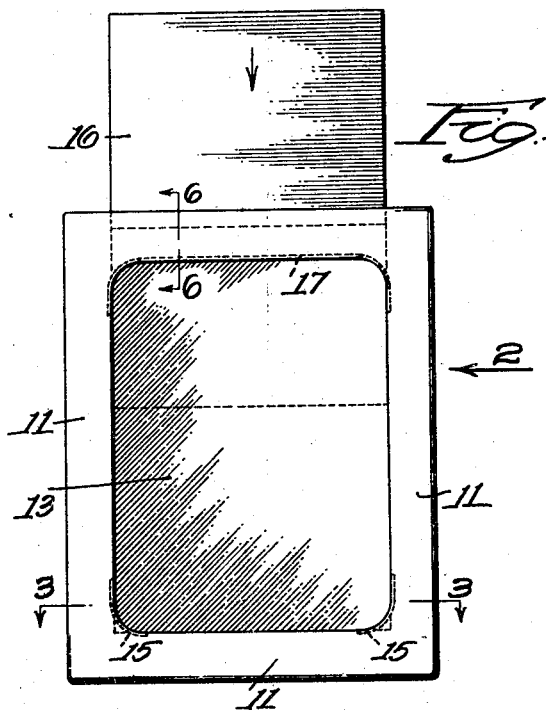
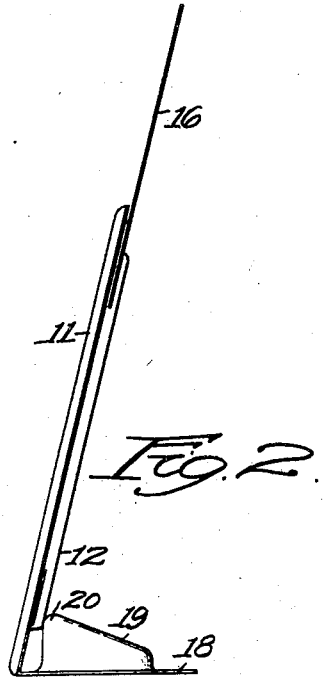
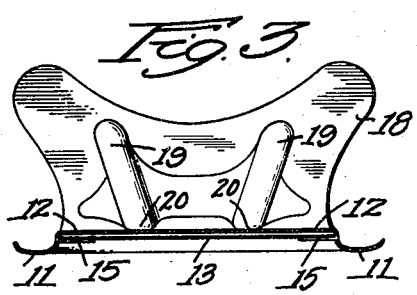
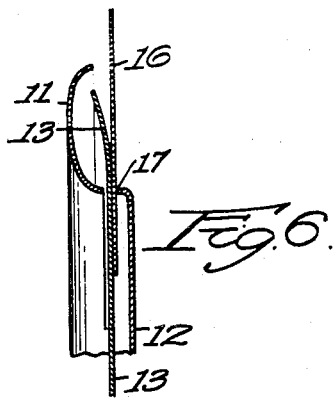
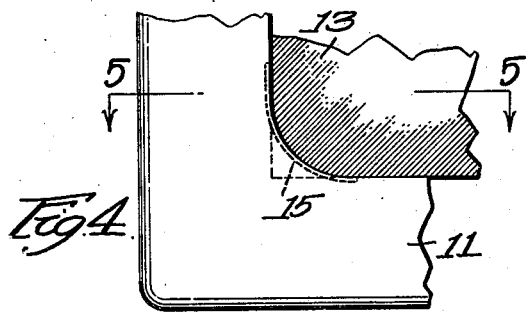

Patented Oct. 21, 1930

1,779,069

UNITED STATES PATENT OFFICE

WILLIAM H. LANE, OF LEOMINSTER, MASSACHUSETTS, ASSIGNOR TO STANDARD PYROXOLOID CORPORATION, OF LEOMINSTER, MASSACHUSETTS, A CORPORATION OF MASSACHUSETTS

PICTURE FRAME

Application filed March 28, 1930. Serial No. 439,827.

This invention relates to a picture frame formed of sheet pyroxylin or similar material.

The principal objects of the invention are to provide a frame suitable for holding a picture and to provide integral therewith a base for supporting it firmly in an upright or inclined position; to provide means forming a permanent part of the frame for covering the picture to be shown with a transparent sheet and to provide extremely simple and inexpensive means for inserting the picture in the frame behind the transparent sheet and holding it in position.

Other objects and advantages of the invention will appear hereinafter.

Reference is to be had to the accompanying drawings in which

Fig. 1 is a front view of a preferred embodiment of this invention;

Fig. 2 is a side elevation;

Fig. 3 is a section near the bottom showing the supporting base of the frame;

Fig. 4 is an enlarged detail view of one corner of the device;

Fig. 5 is a sectional view on the line 5—5 of Fig. 4, and

Fig. 6 is an enlarged sectional view on the line 6—6 of Fig. 1.

The frame is formed preferably from a single sheet of pyroxylin which may be colored or ornamented in any desired way to present an attractive appearance. This sheet is pressed up in dies so as to provide a frame proper with a margin 11 around it and having a space back of it depressed to a lower plane and constituting a back 12. This space is provided at the front with a separate sheet 13 of transparent pyroxylin or other material which fits against the transverse walls 14 of the depression in the frame throughout. It extends all the way from the bottom of this depression to the top of it and beyond the same. The side walls 14 of the depression for receiving this sheet 13 are at right angles to the back and this sheet is held therein by engagement with these side walls which it fits closely and by projecting into certain slits.

There are two corner slits 15 at the lower corners of the frame sawed or otherwise cut through the transverse walls 14. These slits are very narrow but sufficient to receive the sheet 13 and also the picture 16. At the top the corresponding walls are sawed or slit through all the way from one side to the other so as to form a top slit 17. The sheet 13 is bent toward the front where it comes out through the slit 17 and furnishes a convenient guide by which a photograph or other picture can be inserted along this sheet and through the slit into its final position in the frame.

This constitutes a very simple and convenient means for holding a picture. The transparent sheet 13 is really a part of the frame and practically permanently mounted, although it does not have to be cemented in place on account of the way in which it is held. It constitutes a means for keeping the picture in the frame and keeping it free from dust and is transparent so that its presence is hardly noticeable.

To support the frame in inclined position or in any other position, a part of the pyroxylin sheet of which the frame 11 is made is bent back to form a horizontal base 18. This is provided with two upward hollow projections 19 in the form shown, convex on top, and these have forwardly projecting points 20 which are cemented to the rear of the back 12 of the frame. They extend up a considerable distance from the base and engage the back at a convenient point where they make the construction rigid at that point. The base otherwise consists only of a thin sheet of pyroxylin but these projections greatly strengthen it and also hold the frame in the position intended.

This is a very inexpensive frame to make and it can be formed in various ways and used for various purposes other than supporting pictures or photographs. It will be understood that the picture is held in the slits in the same way as the transparent sheet 13 and of course goes in behind it on account of this sheet being bent back at the top substantially in contact with the margin of the frame on the rear.

Although I have illustrated and described only one form of the invention I am aware of the fact that modifications can be made therein by any person skilled in the art without departing from the scope of the invention as expressed in the claims. Therefore I do not wish to be limited in this respect but what I do claim is:—

1. As an article of manufacture, a frame comprising a sheet of pyroxylin formed with marginal surfaces rounded off to present the appearance of a frame with its center depressed to form a back, transverse walls between the back and the margins, the wall at the top having a slit therethrough in a plane parallel to the back entirely across the top thereof, a transparent sheet extending through said slit and covering the entire back but spaced therefrom to form a transparent cover for a photograph or the like to be inserted behind it, said transparent sheet projecting through the top of the depressed portion and being bent forwardly toward the rear side of the top margin to assist in guiding the photograph into position.

2. As an article of manufacture, a frame comprising a piece of sheet material having marginal surfaces rounded off to present the appearance of a frame and its center depressed to form a back, transverse walls between the back and the margins, the wall at the top having a slit therethrough across the top thereof, a transparent sheet inserted through said slit and located on the front side of the back but spaced therefrom to form a transparency over the back, and slits through the corners of said transverse walls at the bottom for receiving the corenrs of the transparent sheet.

3. As an article of manufacture, a picture frame comprising a sheet of pyroxylin or the like having its center depressed so as to leave margins around the edge to simulate an ordinary picture frame and having a portion of the sheet at the bottom bent backwardly at a desired angle to constitute a base for holding the front portion in the desired position, said base having hollow portions projecting upwardly therefrom and engaging the lower portion of the back of said frame and cemented thereto to constitute a firm and rigid construction.

In testimony whereof I have hereunto affixed my signature.

WILLIAM H. LANE.